Jan. 2, 1962 P. KLAMP 3,015,284
FLOOR TRUCK FOR SUB-FLOOR CONVEYOR SYSTEM
Filed April 17, 1958 2 Sheets-Sheet 1
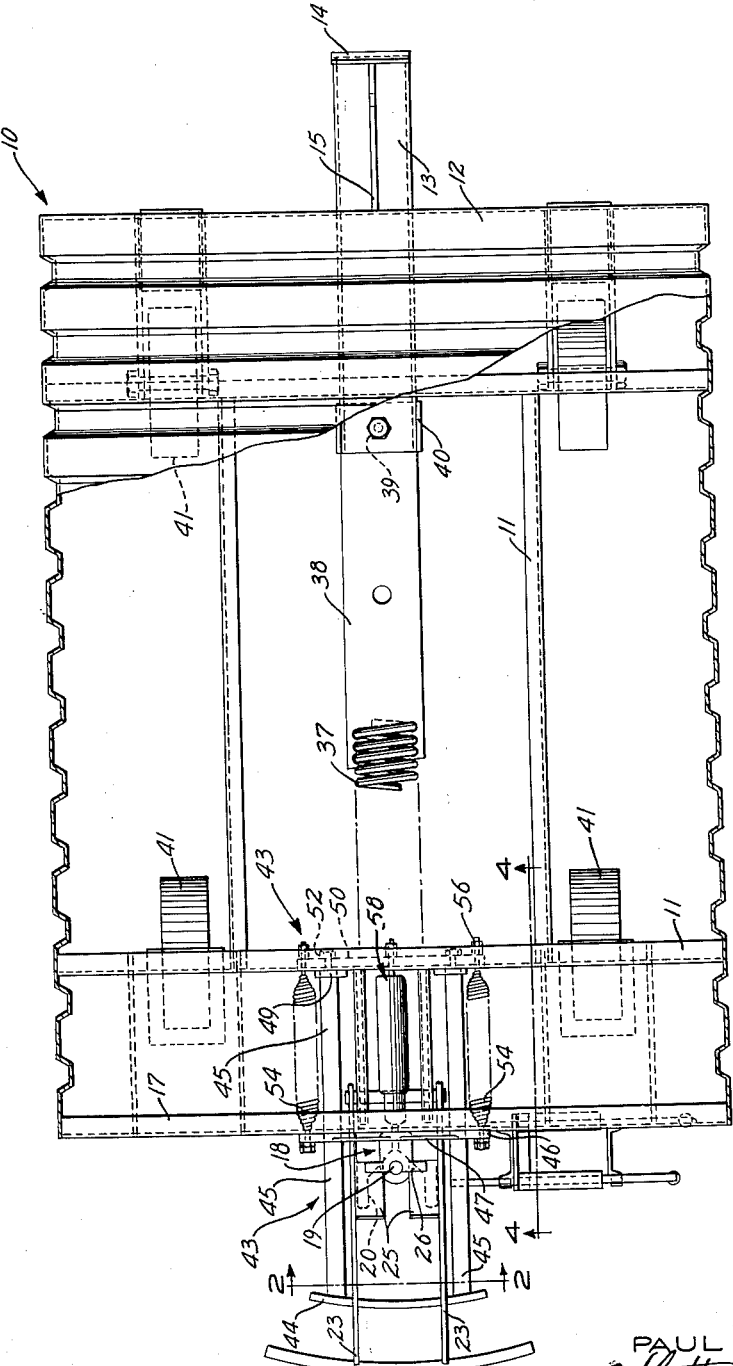
INVENTOR.
PAUL KLAMP
BY Whittemore, Hulbert &
Belknap
ATTORNEYS

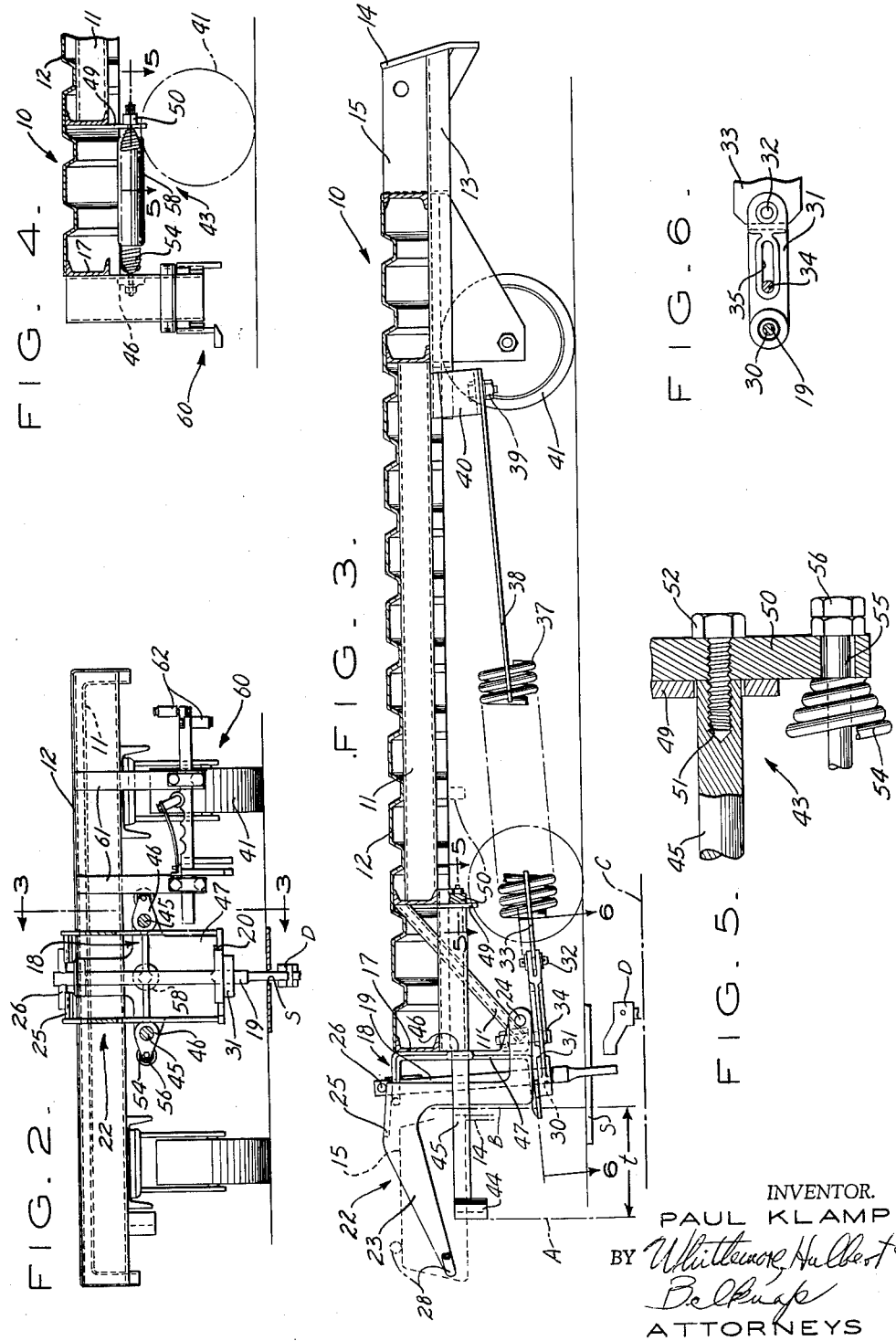

United States Patent Office 3,015,284
Patented Jan. 2, 1962

3,015,284
FLOOR TRUCK FOR SUB-FLOOR CONVEYOR SYSTEM
Paul Klamp, St. Clair Shores, Mich., assignor to Mechanical Handling Systems, Inc., Detroit, Mich., a corporation of Michigan
Filed Apr. 17, 1958, Ser. No. 729,212
13 Claims. (Cl. 104—172)

The present invention relates to an improved floor truck or dolly for an industrial sub-floor conveyor system, such as constitutes the general subject matter of my copending application, Serial No. 682,797, filed September 9, 1957. In a system of this type, a desired arrangement of sub-floor power chain or chains is installed, the chain carrying dogs or lugs which drivingly engage tow pins on the trucks. These pins project downwardly through floor slots above the chain which define a conveyor path or track, and through this type of drive the trucks and their loads are propelled in a plant as desired, usually under the control of appropriate sub-floor switch means.

Serious impact problems are presented in the operation of a conventional system of this sort, due to the heavy weight of the loads transported on the trucks added to the considerable weight of the trucks themselves, as when the trucks strike one another in coming to a halt at an accumulation station or the like. Although the physically destructive effect of the impact may be designed out by using appropriately strong and heavily braced structure (yet at correspondingly increased cost), other objections remain. Among these are the fact that the halted truck is apt to rebound upon impact, possibly departing from a desired accumulation or other control zone, or at best of occupying and idling an excessive floor space. Further, the impact gives rise to an inertial force in the load apt to have the effect of shifting the latter on the truck, or sliding it off altogether.

In particular reference to a typical floor truck system, in which the trucks are propelled by a sub-floor power chain through the agency of a tow pin projecting through a floor slot, it has heretofore been proposed to equip the tow pin with a mechanism to move it out of position for driving engagement by the power chain, and to connect this mechanism with a wheel or caster brake on the truck, thereby to apply braking effort to the truck as its tow pin is disengaged from the power member. However, a system of this sort is limited in application to installations in which the loaded trucks are of relatively light weight and travel at limited speeds, since once the tow pin is disengaged there is very little space for additional travel to the point of full impact with a preceding truck.

Moreover, the wheel or caster brakes have to be adjusted as the caster treads wear, the degree of wear increasing in proportion to the frequency of stopping, and the brake shoes of course also wear.

It is therefore a general object of the invention to provide an improved floor truck to overcome these defects, being particularly devised for use in a sub-floor installation as described, although the principles of the invention are also applicable generally in cases where impact problems in the operation of a truck, trolley or like carrier are a factor.

Another object is to provide a truck having means of a compound spring and shock absorber nature for cushioning and snubbing or damping the truck in a short decelerative travel, at the time of impact with another truck or other object, thereby avoiding objections of load slippage and/or truck rebound.

Another general object is to provide an anti-shock deceleration control for a floor truck or like carrier propelled as described above, in which a dual acting, composite type bumper device is mounted on the forward end of the carrier for movement relative thereto upon striking a preceding carrier. The bumper device is operatively connected to the truck tow pin or equivalent member, as well as to the shock absorber device in such way as to operate the two successively, in the order named.

Thus, the tow pin or equivalent propelling member on the truck is first decoupled from its engagement by the power chain, and the shock absorber device then comes into play to decelerate the carrier smoothly and without shock in a minimum remaining travel. Due to this sequential action the operation of the shock absorber device is made more efficient, since it need not oppose the force of the power chain, but need only overcome the free momentum of the truck and its load.

Another advantage in respect to personnel safety is involved, in that should a workman be inadvertently caught between two colliding trucks, although he may be hurt by the inertial momentum of the moving truck, he will not be nearly as seriously injured as he would if the truck were moving under power.

Further in accordance with the invention, trucks equipped with the compound, successively acting bumper device as described above, are also provided with a rear bumper at their opposite end, which is positioned for impact engagement by the front end bumper device of a similar truck. This insures that the trucks will not only have a smooth, anti-shock yet quick deceleration upon impact, but also that successive trucks can be accumulated in a minimum length floor zone.

More specifically, it is an object of the invention to provide an automatically snubbed floor truck or like carrier, including a movable impact bumper cushioned by spring means and a coacting fluid pressure shock absorbing or impact damping unit, preferably hydraulic, to bring the truck to a smooth halt in a minimum distance after impact.

A general object is to provide a combined hydraulic-spring type mechanism of this sort in which the shock absorber is the primary impact cushioning and snubbing unit. It is resistive to both elongation in snubbing and compression in return or resetting, and it is assisted in the snubbing function by the spring, but the main purpose of the latter is to overcome shock absorber resistance to compression and return the shock absorber from elongated to initial condition. Hence, in accordance with the invention the spring and shock absorber are so selected that the former will store up sufficient force to accomplish this reset function, yet not sufficient force to produce rebound away from the truck or other object which was struck. Thus, the spring returns the bumper to original position only when it and the struck object part company.

In a combination of this sort the characteristics of the spring and hydraulic units are opposite in respect to the force they exert upon elongation, with the result that the characteristics offset one another. The resultant is a reasonably average resistive force throughout the decelerative travel.

A further object is to provide a simplified spring and shock absorber arrangement of this sort wherein due to the averaging out of the resistive forces, as mentioned above, it is readily possible to compute and select spring means of appropriate strength and a shock absorber of proper rating to accomplish the halting of a truck or like carrier in a minimum space and without excess load inertia and truck rebound.

It is also desirable to incorporate in such a truck suitable provisions for neutralizing the effect of still another type of impact, i.e., that arising when a sub-floor conveyor chain dog resumes driving engagement with the truck tow pin. Impacts of this sort unduly stress the truck tow pin and its mount, as well as having the possible effect of causing a reverse inertial shift of the load on the truck.

Therefore, another object of the invention is to provide in a truck or similar carrier having anti-shock and safe decelerative provisions of the type described above, and further cushioned means to absorb destructive shock on the truck tow pin upon being engaged by a sub-floor chain or related propelling device.

The foregoing as well as other objects will become more apparent as this description proceeds, especially when considered in connection with the accompanying drawings illustrating preferred embodiments of the invention, wherein:

FIG. 1 is a top plan view of a truck incorporating the improvements of the invention, with its platform partially broken away to show structural features;

FIG. 2 is a view in transverse vertical section along a line corresponding to line 2—2 of FIG. 1;

FIG. 3 is a view in vertical longitudinal section on line 3—3 of FIG. 2;

FIG. 4 is a view in longitudinal section on line 4—4 of FIG. 1;

FIG. 5 is a fragmentary view in enlarged scale and horizontal section on line 5—5 of FIGS. 3 and 4, showing a slide bar mounting detail of the impact bumper of the truck; and FIG. 6 is a fragmentary view in horizontal section along line 6—6 of FIG. 3, showing a detail of the tow pin cushioning provisions.

The improved mobile truck or load carrier of the invention is generally designated by the reference numeral 10. It comprises a strong and well braced frame 11 of channel iron construction, covered on its top and sides by a sheet steel platform 12, which is ribbed or corrugated for added strength.

The frame carries a rear bumper extension 13 at the center thereof, the extension being equipped with a bumper plate 14. This plate is in the form of a metal strap secured to the extension 13 in a forwardly and upwardly inclined disposition, and at the top of plate 14 a web 15 of the extension 13 extends forwardly to a junction with the rearmost channel of frame 11. The purpose of a bumper provision of this sort will be hereinafter referred to.

At its opposite, forward end, the front cross piece 17 of the truck frame 11 has welded to its center a tow pin supporting and guiding plate member 18, in the form of a bracket forwardly flanged at its top and bottom, in an arrangement similar to that illustrated and described in my copending application identified above. A vertically elongated depending tow pin 19 is guided in openings in the flanges of this bracket 18, including a forwardly facing slot 20 (FIG. 1) in the lower flange thereof. Tow pin extends downwardly through a floor track slot for driving engagement by a power chain, conventionally shown at C in FIG. 3. The track slot is designated S.

A pivoted elevating frame 22 is provided for the tow pin 19, including a pair of angle arms 23 of generally Z-shaped outline suitably connected in laterally spaced parallel relation to one another. The rear end of each arm is pivotally mounted by a pin 24 to a suitable forwardly and downwardly extending bracket or like substructure part 11' of the truck frame 11. In a medial zone, the elevating frame arms 23 are each provided with an inwardly projecting pin lifter piece or tappet member 25, which members engage beneath a transverse stud 26 on the top of tow pin 19.

The forward extremities of the lifter frame arms 23 are joined by a curved operating bumper rod 28, and it will be seen that as this rod comes into engagement with the rear bumper 14 of a preceding truck 10, it is cammed upwardly along that bumper and then slides, upon further advancing motion of its truck, to the dotted line position of FIG. 3, i.e., along the top of the web 15 of the truck which is struck.

This occasions a clockwise swinging of the elevating or actuating frame 22 (FIG. 3) about its pivot at 24, accompanied by the lifting of the tow pin 19, as its transverse lifting stud 26 is cammingly engaged by the frame lifting tappets 25. The effect is to elevate the tow pin 19 from the position indicated in FIGS. 2 and 3, thereby disengaging it from the driving sub-floor chain C, or its drive dog D.

Tow pin 19 is, immediately above the floor level, slidably received in a forward aperture 30 (FIGS. 3 and 6), of a horizontal tension link 31, the rear extremity of which link is pivoted at 32 to a spring retainer plate 33. A guide and pivot pin 34 suitably affixed to the substructure 11' of the frame 11 is received in an elongated medial slot 35 of the link 31. A strong coil tension spring 37 (FIGS. 1 and 3) connects the rear end of spring retainer plate 33 with the forward end of a similar retainer plate 38, and the rear plate extremity is pivoted by an upright stud 39 in a fixed depending bracket 40 on the truck frame 11.

Accordingly, it is seen that as the lower end of the tow pin 19 is engaged by the sub-floor driving chain C, it is swung forwardly relative to the truck under the yielding resistance of the spring 37, until the rear end of the slot 35 engages the fixed guide and pivot pin 34. Thereafter, the draft action of the chain C on the tow pin and the tow pin on the truck is positive. Destructive impacts on the tow pin are avoided. Moreover, the swiveling connections of tow pin to link 31, link 31 to spring retainer 33 and spring retainer 38 to bracket 40 are such as to constitute a universal articulated linkage, in the horizontal plane, through which the cushioning action on the tow pin is equally effective, regardless of the angularity of truck 10 at the time it is engaged by the power chain.

Furthermore, the connections, as described above and at greater length in my copending application, substantially reduce the force needed to be exerted by the sub-floor chain in putting the truck 10 in motion. Figures attesting to this, derived from floor tests at different chain speeds, are set forth in that application.

In other respects the truck 10 is conventional in regard to its swiveled floor casters or rollers 41 and further structural features not hereinafter described in detail.

The reference numeral 43 generally designates an impact absorbing and snubbing bumper assembly which is a basic improvement of the present invention. This assembly includes a forward bumper 44 located slightly below and to the rear of the tow pin elevating bumper 28, whereby the bumper 44 of a given truck will engage the rear bumper 14 of a preceding truck only after its tow pin 19 has been elevated out of driving engagement by the sub-floor chain. A pair of parallel and laterally spaced, horizontal slide rods 45 are fixed to the bumper 44 and extend rearwardly thereof. These rods are slidably guided in bosses 46 of a guide plate 47 which is rigidly attached to the truck frame 11, and which may be an integral part of the tow pin guide bracket 18 welded to the forward frame cross piece 17. The guide plate 47 is in depending relation to the frame, as depicted in FIG. 2.

The bumper slide rods 45 are further guided towards their rear by a second guide bracket or plate 49 welded to another cross piece of the truck frame 11; and (referring to FIG. 5 in conjunction with FIGS. 1 and 3) a transverse yoke bar 50 is secured to the rear ends of the respective slide rods 45, rearwardly of the guide plate 49. For this purpose, the ends of the rods are provided with tapped openings 51 receiving bolts 52 which extend through apertures adjacent the respective ends of the yoke bar 50.

Accordingly, as the cushioning bumper 44 strikes a preceding truck, it shifts the slide rods 45 and yoke bar 50 rearwardly under cushioning and snubbing resistance by the means to be described. This distance, in a maximum, may be considered to be the distance between the dot-dash reference lines A and B in FIG. 3, and for a typical installation is about 9½ inches. Such travel is hereinafter denoted "t."

A pair of laterally spaced coil tension springs 54 are anchored at their opposite ends to the bosses 46 of guide and mounting bracket plate 47 and to the yoke bar 50, respectively. The means for this purpose may comprise studs 55 positively connected to the respective spring ends, with lock nut provisions 56 restrainingly engaging the plate 47 and yoke bar 50, respectively, as shown in FIG. 5.

In further accordance with the invention, there is provided a central shock absorber device 58 anchored forwardly on the mounting plate 47 and rearwardly on the yoke bar 50 by means similar to the connections for the respective tension springs 54. The unit 58 is a standard hydraulic damping device for horizontal mounting, for example, as produced by the Gabriel Company of Cleveland, Ohio, and its internal provisions constitute no part of the present invention.

In a typical installation, the damping unit 58 is designed for a 9.59 inch stroke in elongation, having an initial resistance of 400 pounds at a truck speed of 30 feet per second, increasing sharply to about 1500 pounds during the last 1¾ inches of the extension stroke. The abrupt terminal decelerating peak is for the purpose of insuring that the truck comes to an absolute yet cushioned stop in the event its energy of motion has not been absorbed in the preceding major portion of the stroke of unit 58. The unit 58 is designed to present a much less resistance in compression.

The reference numeral 60 (FIGS. 1, 2 and 4) generally designates an adjustably settable flag device or signal unit suspended from the truck frame 11 by hanger straps 61. This unit is not part of the present invention, its purpose being to enable its projecting roller type flags 62 to be selectively positioned to engage and trip switch control units of an installation in order to determine the path followed by the truck.

The damping or snubbing unit 58 and the coil springs 54 are coordinately selected, by resort to calculations to be set forth, to produce a desired deceleration of the truck 10, which will bring the truck to a quick halt without rebound or inertial forward shift of the load on the truck platform 12, while at the same time effecting the halt within the desired maximum travel, $t$, i.e., the distance between reference lines A and B. The calculations are simple and basic ones involving truck and truck load weight, velocity of travel at impact, i.e., energy built up in truck movement and to be absorbed, and the like.

In arriving at the desired deceleration speed for a given load to keep the load from sliding, the forward force of inertia set up in the load by slowing it down must be less than the product of load weight times coefficient of friction, and the forward force is a function of the truck speed and distance of travel in decelerating. For a typical installation in transporting cartoned products, the coefficient of friction of paper on a steel surface will be involved, i.e. 1/3.

It will be assumed that deceleration over the distance, $t$, will be uniform, which is reasonably accurate due to the fact that the tension of or force sustained by cushion springs 54 increases in elongation while decelerating; whereas the resistance imposed by the hydraulic shock absorber unit 58 decreases as the speed decreases. Thus, the two force change phenomena by and large cancel one another out, and a uniform decelerative effect may be considered to exist.

The standard equation for uniform deceleration, $d$, in feet per second per second, is:

$$d = \frac{V^2}{2t}$$

where V equals the speed of the truck at the start of deceleration, in feet per second; and $t$ equals the decelerating travel in feet.

Assuming a value for V of 2 feet per second and of 9 inches for $t$, we have:

$$d\frac{4}{1.5} = 2.67 \text{ feet per second per second}$$

The resistive or deceleration force P necessary to effect this deceleration is obtained from the further basic equation:

$$P = md$$

where $m$ equals the mass of the truck (weight divided by acceleration due to gravity).

Assuming the weight of the truck is 800 pounds and the weight of its load is 6,000 pounds, we have:

$$P = \frac{6,800}{32} \times 2.67 = 567 \text{ pounds}$$

Since the load times friction coefficient equals 6,000 ×⅓ or 2,000 pounds, it is seen that the deceleration force P of 567 pounds is only about 25% of the load-coefficient product, and there will be no slide of the load on the truck under the assumed conditions.

The computation for determining the cushioning force necessary for halting the truck in the stipulated travel, $t$, of 9 inches or .75 foot, under the speed V (2 feet per second) at the start of deceleration is an equally simple one, based upon the equation for energy E built up in the moving mass, including truck and its load, which is also the energy to be absorbed.

Built up kinetic energy E is a function of mass and speed according to the relation:

$$E = \frac{mV^2}{2} = \frac{6800 \cdot 4}{32 \cdot 2} = 424 \text{ foot lbs.}$$

Energy to be absorbed equals built up energy E and is in further accordance with the further relation:

$$E = t \cdot P_a, \text{ whence } P_a = \frac{E}{t}$$

where $P_a$ equals the average resistance in pounds necessary to be imposed by the springs 54 and damping device 58 during cushioning.

Accordingly, the required cushioning force is determined by $$P_a = \frac{424}{.75} = 565 \text{ pounds}$$

The springs 54 and damping unit 58 are then chosen to give this desired cushioning or deceleration force, and, as indicated above, the springs should store up only sufficient force to overcome the resistance in compression of the absorber 58, and not to reversely move the halted truck. Accordingly, the cushioning bumper 44 will be returned to fully extended forward position, resetting shock absorber 58, only when the truck ahead of it is removed. It is an important consideration in the invention that, in addition to anti-shock deceleration, there shall be no rebound at any time after initial impact.

It is seen that the invention affords a compound-cushioned and snubbed truck, capable of heavy duty operation at relatively high floor speeds and under heavy load, without destructive impact and without rebound on or after impact, or shifting of the load on its platform. Truck units accumulated at any given conveyor station are, upon halting, maintained in close contacting relation, so that the length of track space occupied by an accumulated series of trucks is a minimum. Prior to reaching this condition each truck is decoupled by tow pin actuating bumper 28 from the sub-floor chain, with the result that the trucks roll to their halted position only under the force of their own movement.

An important factor in such an invention is the evaluation of the resistance of a device in performing a function as the primary truck snubbing agency, in reference to the force necessary to be available, after halting of the truck, to return that device and the bumper to initial position, without rebounding the truck. The combination of correlated shock absorber and spring means illustrated and described above is a simple, practical and effectively evaluated one for those ends.

The invention improves a towed floor truck installation in point of facilitating tow pin disengagement, in preventing shifting of loads thereon in deceleration, in respect to protection of personnel, in making possible an improved and more compact accumulation, etc., by reason of the successive operation of the bumpers 28 and 44 upon striking, in the order named, the rear bumper 14 of a preceding truck. The tow pin 19 is lifted out of driving engagement with the sub-floor drive dog D simultaneously with the initial contact. It is not subjected to severe frictional engagement with the dog, tending to impede its lifting, as it would be if the lift effort were delayed until the shock absorber of the truck had been strongly stressed by the power chain C; and, moreover, the shock absorber device operates with better effect when not forced to act aginst the positive driving action of the chain.

What I claim as my invention is:

1. A load conveying unit comprising a mobile load supporting carrier having a propelling member movably mounted thereon for a limited lost motion in the direction of movement of the carrier and adapted to be engaged and disengaged by a moving power device to propel said carrier when so engaged, spring means opposing the lost motion movement of said member, and anti-shock control means for said carrier connected to the latter and acting to move said propelling member out of said propelling engagement and to decelerate said carrier smoothly upon impact engagement with another object, said control means comprising a bumper device mounted on said carrier and movable thereon by said impact engagement, a shock absorber device mounted on and anchored to said carrier, and means operatively connecting said bumper device with said propelling member and said shock absorber device whereby, in the order named, to move the former out of said propelling engagement and to cause the latter to decelerate the carrier.

2. A load conveying unit comprising a mobile load supporting carrier having a propelling member movably mounted thereon for a limited lost motion in the direction of movement of the carrier and adapted to be engaged and disengaged by a moving power device to propel said carrier when so engaged, spring means opposing the lost motion movement of said member, and anti-shock control means for said carrier connected to the latter and acting to move said propelling member out of said propelling engagement and to decelerate said carrier smoothly upon impact engagement with another object, said control means comprising a bumper device mounted on said carrier and movable thereon by said impact engagement, a shock absorber device mounted on and anchored to said carrier, and means operatively connecting said bumper device with said propelling member and said shock absorber device whereby, in the order named, to move the former out of said propelling engagement and to cause the latter to decelerate the carrier, said bumper device comprising a pair of bumper members movably mounted on said carrier for successive engagement with said object and operatively connected to said propelling member and shock absorber device.

3. A load conveying unit comprising a mobile load supporting carrier having a propelling member movably mounted thereon for a limited lost motion in the direction of movement of the carrier and adapted to be engaged and disengaged by a moving power device to propel said carrier when so engaged, spring means opposing the lost motion movement of said member, and anti-shock control means for said carrier connected to the latter and acting to move said propelling member out of said propelling engagement and to decelerate said carrier smoothly upon impact engagement with another object, said control means comprising a bumper device mounted on said carrier and movable thereon by said impact engagement, a shock absorber device mounted on and anchored to said carrier, and means operatively connecting said bumper device with said propelling member and said shock absorber device, whereby, in the order named, to move the former out of said propelling engagement and to cause the latter to decelerate the carrier, said bumper device comprising a pair of bumper members movably mounted on said carrier for successive engagement with said object, means operatively connecting the first engaging bumper member with said propelling member, and means operatively connecting the second engaging bumper member with said shock absorber device.

4. A load conveying unit comprising a mobile load supporting carrier having a propelling member movably mounted thereon for a limited lost motion in the direction of movement of the carrier and adapted to be engaged and disengaged by a moving power device to propel said carrier when so engaged, spring means opposing the lost motion movement of said member, and anti-shock control means for said carrier connected to the latter and acting to move said propelling member out of said propelling engagement and to decelerate said carrier smoothly upon impact engagement with another object, said control means comprising a bumper device mounted on said carrier and movable thereon by said impact engagement, a shock absorber device mounted on and anchored to said carrier, and means operatively connecting said bumper device with said propelling member and said shock absorber device whereby, in the order named, to move the former out of said propelling engagement and to cause the latter to decelerate the carrier, said shock absorber device comprising spring and fluid pressure cushioning members each connected to said carrier and to said bumper device.

5. A load conveying unit comprising a mobile load supporting carrier having a propelling member movably mounted thereon for a limited lost motion in the direction of movement of the carrier and adapted to be engaged and disengaged by a moving power device to propel said carrier when so engaged, spring means opposing the lost motion movement of said member, and anti-shock control means for said carrier connected to the latter and acting to move said propelling member out of said propelling engagement and to decelerate said carrier smoothly upon impact engagement with another object, said control means comprising a bumper device mounted on said carrier and movable thereon by said impact engagement, a shock absorber device mounted on and anchored to said carrier, and means operatively connecting said bumper device with said propelling member and said shock absorber device whereby, in the order named, to move the former out of said propelling engagement and to cause the latter to decelerate the carrier, said bumper device comprising a pair of bumper members movably mounted on said carrier for successive engagement with said object, means operatively connecting the first engaging bumper member with said propelling member, and means operatively connecting the second engaging bumper member with said shock absorber device, said shock absorber device comprising spring and fluid pressure cushioning members each connected to said carrier and to said second engaging member of said bumper device.

6. A load conveying unit comprising a mobile load supporting carrier having a propelling member movably mounted thereon for a limited lost motion in the direction of movement of the carrier and adapted to be engaged and disengaged by a moving power device to propel said carrier when so engaged, spring means opposing the lost motion movement of said member, and anti-shock control means for said carrier connected to the latter and acting to move said propelling member out of said propelling engagement and to decelerate said carrier smoothly upon impact engagement with another object, said control means comprising a bumper device mounted on said carrier and movable thereon by said impact engagement, a shock absorber device mounted on and anchored to said carrier, and means operatively connecting said bumper device with said propelling member and said shock absorber device whereby, in the order named, to move the former out of said propelling engagement and to cause the latter to decelerate the carrier, said carrier having a bumper fixedly positioned at its end opposite said bumper device for impact engagement by the bumper device of a similar conveying unit, thus to enable the anti-shock accumulation of successive units in a restricted zone.

7. A load conveying unit comprising a mobile load supporting carrier having a propelling member adapted to be engaged and disengaged by a moving power device to propel said carrier when so engaged, means mounting said propelling member for movement on the carrier transversely of the direction of movement of the latter and said power device to thus drivingly engage and disengage the member, said propelling member having yieldable means operatively connecting the same with said carrier to propel the latter after such engagement by said device, an anti-shock control means for said carrier operatively connected to the latter and acting to move said propelling member transversely out of said propelling engagement and to decelerate said carrier smoothly upon impact engagement with another object, said control means comprising a bumper device mounted on said carrier and having a part movable on the latter by said impact engagement, a shock absorber device mounted on and anchored to said carrier, and means operatively connecting said bumper device with said propelling member and with said shock absorber device, whereby to move the former transversely out of said propelling engagement and to cause the latter to oppose said movement of said part and thus decelerate the carrier.

8. A load conveying unit comprising a mobile load supporting carrier having a propelling member adapted to be engaged and disengaged by a moving power device to propel said carrier when so engaged, means mounting said propelling member for movement on the carrier transversely of the direction of movement of the latter and said power device to thus drivingly engage and disengage the member, said propelling member having yieldable means operatively connecting the same with said carrier to propel the latter after such engagement by said device, and anti-shock control means for said carrier operatively connected to the latter and acting to move said propelling member transversely out of said propelling engagement and to decelerate said carrier smoothly upon impact engagement with another object, said control means comprising a bumper device mounted on said carrier and having a part movable on the latter by said impact engagement, a shock absorber device mounted on and anchored to said carrier, and means operatively connecting said bumper device with said propelling member and with said shock absorber device whereby, in the order named, to move the former transversely out of said propelling engagement and to cause the latter to oppose said movement of said part and thus decelerate the carrier, said propelling member having means to mount the same for a longitudinal lost motion travel on and relative to said carrier, as opposed by said yieldable means, prior to positively engaging and propelling the carrier.

9. A load conveying unit comprising a mobile load supporting carrier having a propelling member adapted to be engaged and disengaged by a moving power device to propel said carrier when so engaged, means mounting said propelling member for movement on the carrier transversely of the direction of movement of the latter and said power device to thus drivingly engage and disengage the member, said propelling member having yieldable means operatively connecting the same with said carrier to propel the latter after such engagement by said device, and anti-shock control means for said carrier operatively connected to the latter and acting to move said propelling member transversely out of said propelling engagement and to decelerate said carrier smoothly upon impact engagement with another object, said control means comprising a bumper device mounted on said carrier and movable thereon by said impact engagement, a shock absorber device mounted on and anchored to said carrier, and means operatively connecting said bumper device with said propelling member and with said shock absorber device, whereby, in the order named, to move the former transversely out of said propelling engagement and to cause the latter to decelerate the carrier, said bumper device comprising a pair of bumper members mounted on said carrier for movement upon engagement with said object, means operatively connecting one of said bumper members with said propelling member to move the same transversely upon said engagement with an object, and means operatively connecting the other bumper member with said shock absorber device to cause the latter to oppose said movement of said other bumper member upon said engagement with an object.

10. A load conveying unit comprising a mobile load supporting carrier having a propelling member adapted to be engaged and disengaged by a moving power device to propel said carrier when so engaged, means mounting said propelling member for movement on the carrier transversely of the direction of movement of the latter and said power device to thus drivingly engage and disengage the member, said propelling member having yieldable means operatively connecting the same with said carrier to propel the latter after such engagement by said device, and anti-shock control means for said carrier operatively connected to the latter and acting to move said propelling member transversely out of said propelling engagement and to decelerate said carrier smoothly upon impact engagement with another object, said control means comprising a bumper device mounted on said carrier and movable thereon by said impact engagement, a shock absorber device mounted on and anchored to said carrier, and means operatively connecting said bumper device with said propelling member and with said shock absorber device, whereby, in the order named, to move the former transversely out of said propelling engagement and to cause the latter to decelerate the carrier, said propelling member having means to mount the same for a longitudinal lost motion travel on and relative to said carrier, as opposed by said yieldable means, prior to positively engaging and propelling the carrier, said bumper device comprising a pair of bumper members mounted on said carrier for movement upon engagement with said object, means operatively connecting one of said bumper members with said propelling member to move the same transversely upon said engagement with an object, and means operatively connecting the other bumper member with said shock absorber device to cause the latter to oppose said movement of said other bumper member upon said engagement with an object.

11. A load conveying unit in accordance with claim 9, in which said shock absorber device comprises spring and fluid pressure cushioning members each connected to said carrier and to said second bumper member of said bumper device.

12. A load conveying unit in accordance with claim 10, in which said shock absorber device comprises spring and fluid pressure cushioning members each connected to said carrier and to said second bumper member of said bumper device.

13. A load conveying unit comprising
(a) a mobile load supporting carrier having a propelling member adapted to be engaged and disengaged by a moving power device to propel said carrier when so engaged,
(b) means mounting said propelling member for movement on the carrier transversely of the direction of movement of the latter and said power device to thus drivingly engage and disengage the member,
(c) said propelling member having means operatively connecting the same with said carrier to propel the latter after such engagement by said device, and
(d) shock control means for said carrier operatively connected to the latter and acting to move said propelling member transversely out of said propelling engagement and to decelerate said carrier smoothly upon impact engagement with another object,
(e) said control means comprising a bumper device mounted on an end of said carrier and movable on the latter by said impact engagement,
(f) a decelerator device operatively connected to said carrier to retard motion of the latter after said impact engagement, and
(g) means operatively connecting said bumper device with said propelling member and with said decelerator device, whereby to move the former transversely out of said propelling engagement and to cause the latter to decelerate the carrier,
(h) said carrier having a bumper fixedly positioned at its end opposite said bumper device for impact engagement by the bumper device of a similar conveying unit, thus to enable the anti-shock accumulation of successive units in a restricted zone,
(i) said bumper having means engaging said bumper device of said similar unit in a position to maintain the propelling member of said similar unit out of position for said propelling engagement.

References Cited in the file of this patent

UNITED STATES PATENTS

| | | |
|---|---|---|
| 636,126 | Fenton | Oct. 31, 1899 |
| 927,862 | Lauber et al. | July 13, 1909 |
| 985,170 | Heilemann | Feb. 28, 1911 |
| 1,071,586 | Rowan | Aug. 26, 1913 |
| 1,373,822 | Kleine | Apr. 5, 1921 |
| 1,480,557 | Joyce | Jan. 15, 1924 |
| 1,483,913 | Schwartz | Feb. 19, 1924 |
| 1,512,917 | Finizio | Oct. 28, 1924 |
| 1,548,087 | Heller | Aug. 4, 1925 |
| 1,574,133 | Stafford | Feb. 23, 1926 |
| 1,655,976 | Schmidt | Jan. 10, 1928 |
| 1,843,902 | Ridge | Feb. 2, 1932 |
| 2,619,370 | Leger | Nov. 25, 1952 |
| 2,619,916 | Rainer | Dec. 2, 1952 |
| 2,628,118 | Gunnels | Feb. 10, 1953 |
| 2,737,902 | Folsom | Mar. 13, 1956 |
| 2,844,243 | Christiansen et al. | July 22, 1958 |
| 2,871,799 | King | Feb. 3, 1959 |
| 2,885,969 | Kay et al. | May 12, 1959 |